United States Patent
Wu (10) Patent No.: US 9,125,094 B2
(45) Date of Patent: Sep. 1, 2015

(54) APPARATUSES AND METHODS FOR REPORTING AVAILABILITY OF MEASUREMENT LOG

(75) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 135 days.

(21) Appl. No.: 13/011,998

(22) Filed: Jan. 24, 2011

(65) Prior Publication Data

US 2012/0190364 A1 Jul. 26, 2012

(51) Int. Cl.
H04W 36/00 (2009.01)
H04W 24/10 (2009.01)
H04W 36/14 (2009.01)

(52) U.S. Cl.
CPC ............. *H04W 24/10* (2013.01); *H04W 36/14* (2013.01)

(58) Field of Classification Search
CPC ..... H04W 24/00; H04W 36/30; H04W 36/32; H04W 36/18; H04W 88/06
USPC ......... 455/423–424, 436, 438–440, 442–444, 455/552.1; 370/331–333
See application file for complete search history.

(56) References Cited

U.S. PATENT DOCUMENTS

| | | | | |
|---|---|---|---|---|
| 2002/0021681 A1* | 2/2002 | Madour | | 370/331 |
| 2008/0020770 A1* | 1/2008 | Hofmann | | 455/438 |
| 2009/0023448 A1* | 1/2009 | Attar et al. | | 455/436 |
| 2009/0270079 A1* | 10/2009 | Han et al. | | 455/414.1 |
| 2010/0157944 A1 | 6/2010 | Horn | | |
| 2012/0176918 A1* | 7/2012 | Callender et al. | | 370/252 |

OTHER PUBLICATIONS

3GPP TSG-RAN WG2#71; R2-104300, "Logged MDT reporting indication in mobility", Aug. 23-27, 2010, Madrid, Spain, pp. 1-3.
3GPP TS 37.320 V1.0.0 (Aug. 2010); 3rd Generation Partnership Project; Technical Specification Group TSG RAN Universal Terrestrial Radio Access (UTRA) and Evolved Universal Terrestrial Radio Access (E-UTRA); Stage 2 (Reaease 10); pp. 1-15.

* cited by examiner

*Primary Examiner* — Wayne Cai
*Assistant Examiner* — Matthew Genack
(74) *Attorney, Agent, or Firm* — Birch, Stewart, Kolasch & Birch, LLP (57) ABSTRACT

A mobile communications device with a wireless module and a controller module is provided. The wireless module performs wireless transmissions and receptions to and from a first service network and a second service network. The first service network and the second service network are in compliance with a first communication protocol and a second communication protocol, respectively. The controller module performs measurements on the first service network via the wireless module, and generates a measurement log according to the measurements results. Also, the controller module receives a handover request from the second service network via the wireless module for handing over from the second service network to the first service network, and transmits a handover response indicating availability of the measurement log to the first service network via the wireless module.

9 Claims, 5 Drawing Sheets

APPARATUSES AND METHODS FOR REPORTING AVAILABILITY OF MEASUREMENT LOG

BACKGROUND OF THE INVENTION

1. Field of the Invention

The invention generally relates to radio measurement collection for Minimization of Drive Tests (MDT), and more particularly, to apparatuses and methods for report availability of the MDT logs during inter-Radio Access Technology (RAT) handovers.

2. Description of the Related Art

In a typical mobile communication system, an operator needs to run manual drive-tests to adjust network settings for performance optimizations, including radio coverage optimization, mobility optimization, network capability optimization, channel optimization, Quality of Service (QoS) verification, network planning, and others. In order to reduce the cost and time consumed for the manual drive-tests, a Minimization of Drive Tests (MDT) concept has been proposed, which requires the user equipment (UE) to log its measurement results and report the measurement logs (referred to herein as MDT logs) to the service network, so that the operator may analyze the MDT logs and adjust the network settings without too much burden of the manual drive-tests.

Figure 1:
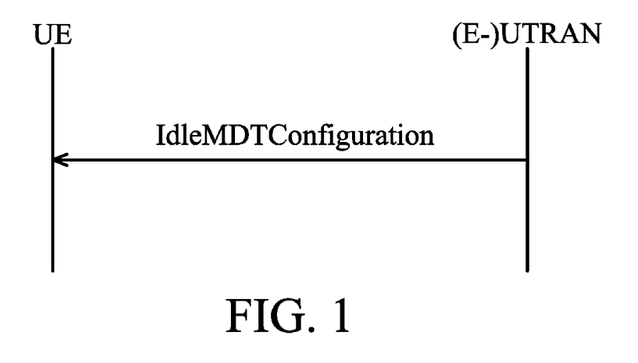
FIG. 1 is a message sequence chart illustrating an MDT measurement configuration procedure.
Figure 2:
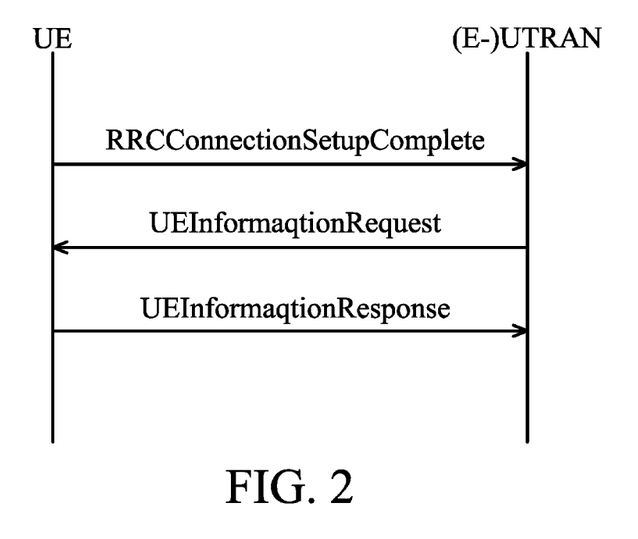
FIG. 2 is a message sequence chart illustrating an MDT log reporting procedure.

Taking the Long Term Evolution (LTE) technology in compliance with the 3GPP TS 37.320 specification, v1.0.0 (referred to herein as the 37.320 specification), and the 3GPP TS 36.331 specification, v1.0.0 (referred to herein as the 36.331 specification) as an example, after a UE is powered on and connected to a UMTS (Universal Mobile Telecommunications System) Terrestrial Radio Access Network (UTRAN) or evolved-UTRAN (E-UTRAN), the UTRAN or E-UTRAN may initiate an MDT measurement configuration procedure with the UE by transmitting an IdleMDTConfiguration message, to indicate the configuration parameters for logged MDT measurements in an idle mode, as shown in FIG. 1. When the UE enters the idle mode from a connected mode, it performs measurement logging according to the configuration parameters in the IdleMDTConfiguration message. Later, when the UE is paged or the user of the UE wishes to make a call, it initiates a Radio Resource Control (RRC) connection establishment procedure by transmitting an RRCConnectionRequest message to the UTRAN or E-UTRAN. Upon receiving the RRCConnectionRequest message, the UTRAN or E-UTRAN replies to the UE with an RRCConnectionSetup message. According to the configuration parameters included in the RRCConnectionSetup message, the UE establishes the RRC connection with the UTRAN or E-UTRAN and further transmits an RRCConnectionSetupComplete message to the UTRAN or E-UTRAN upon completion of the RRC connection establishment. Particularly, the UE includes the information concerning the availability of the MDT logs in the RRCConnectionSetupComplete message. As shown in FIG. 2, if the availability of the MDT logs is indicated, the UTRAN or E-UTRAN may request the UE to report on the MDT logs, by transmitting a UEInformaqtionRequest message to the UE. When receiving the UEInformaqtionRequest message, the UE replies to the UTRAN or E-UTRAN with a UEInformaqtionResponse message which includes the measurement logs.

However, there are situations where the UE can not indicate the availability of the MDT logs to the UTRAN or E-UTRAN, causing the UTRAN or E-UTRAN unable to retrieve the MDT logs. Taking an inter-RAT (Radio Access Technology) handover procedure from a UMTS system to an LTE system as an example, the UE is initially camped on the LTE system and configured to perform MDT measurement logging for the LTE system. Upon moving to an area with stronger signal coverage of the UMTS system, the UE stops the MDT measurement logging and reselects to the UMTS system. Later, in response to a request for a Mobile Originated (MO) call or a Mobile Terminating (MT) call, dedicated radio link(s) is established for the UE to the UMTS system. During the MO call or MT call, the UE is handed over to the LTE system from the UMTS system if the UE is moved back to the area with the stronger signal coverage of the LTE system. It is noted that, although MDT logs for the LTE system are available from the MDT measurement logging performed before reselection to the UMTS system, the UE does not report to the LTE system about the information concerning the availability of the MDT logs when being handed over back to the LTE system. As a result, the LTE system is not able to retrieve the MDT logs from the UE. Similarly, in another example of an inter-RAT handover procedure from an LTE system to a UMTS system, if the MDT logs for the UMTS system are available from a previously performed MDT measurement logging and the UE is handed over back to the UMTS system from the LTE system during an ongoing MO call or MT call, the UE does not report to the UMTS system about the information concerning the availability of the MDT logs. Thus, it is desirable to have an efficient way of reporting the availability of the MDT logs to the service network.

BRIEF SUMMARY OF THE INVENTION

Accordingly, embodiments of the invention provide apparatuses and methods for reporting availability of a measurement log. In one aspect of the invention, a mobile communications device with a wireless module and a controller module is provided. The wireless module performs wireless transmissions and receptions to and from a first service network and a second service network, wherein the first service network and the second service network are in compliance with a first communication protocol and a second communication protocol, respectively. The controller module performs measurements on the first service network via the wireless module, and generates a measurement log according to the measurement results. Also, the controller module receives a handover request from the second service network via the wireless module for handing over from the second service network to the first service network, and transmits a handover response indicating availability of the measurement log to the first service network via the wireless module.

In another aspect of the invention, a method for reporting availability of a measurement log in a mobile communications device is provided. The method comprises the steps of making a Mobile Originated (MO) call or a Mobile Terminating (MT) call in a first service network in compliance with a first communication protocol, receiving a handover request from the first service network for handing over from the first service network to a second service network in compliance with a second communication protocol, and transmitting a handover response to the second service network in response to the handover request, wherein the handover response indicates availability of a measurement log for the second service network.

In yet another aspect of the invention, a service network in compliance with a communication protocol is provided with at least one access node and a control node. The access node performs wireless transmissions and receptions to and from a mobile communications device. The control node requests, via the access node, the mobile communications device to perform measurements on the access node, and prepares a handover request for handing over the mobile communications device to the access node. Also, the control node receives a handover response from the mobile communications device via the access node, and requests the mobile communications device to report the measurement results via the access node in response to the handover response indicating availability of the measurement results.

Other aspects and features of the present invention will become apparent to those with ordinarily skill in the art upon review of the following descriptions of specific embodiments of apparatuses and methods for reporting availability of a measurement log.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 3:
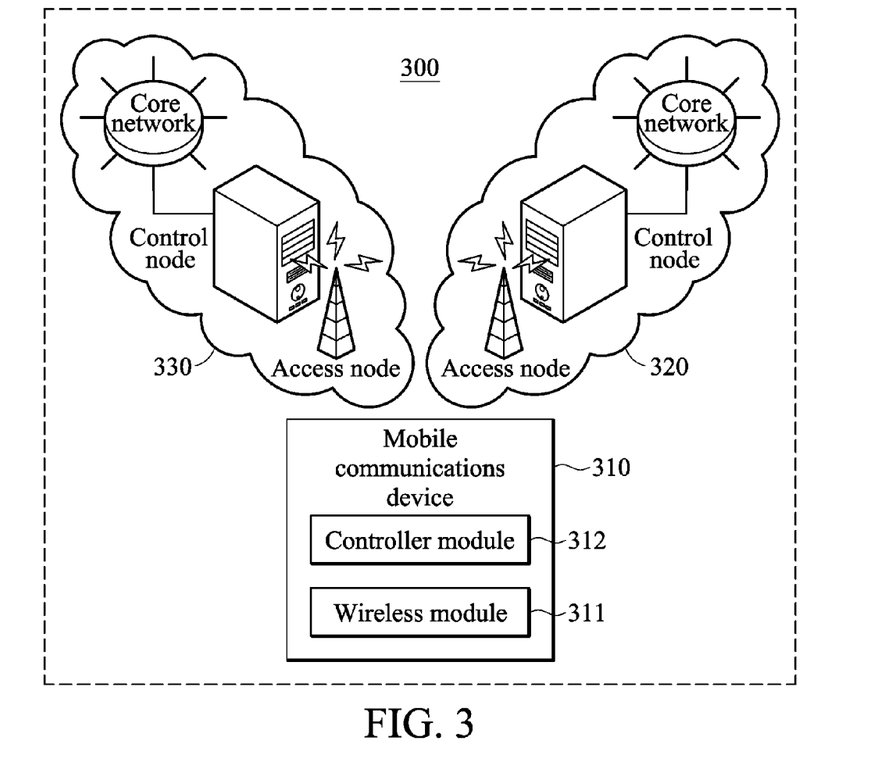
FIG. 3 is a block diagram illustrating a mobile communication environment according to an embodiment of the invention.

FIG. 3 is a block diagram illustrating a mobile communication environment according to an embodiment of the invention. In the mobile communications environment 300, the mobile communications device 310 is wirelessly connected to one of the service networks 320 and 330 for obtaining wireless services. Each of the service networks 320 and 330 comprises at least one access node for performing wireless transmissions and receptions to and from the mobile communications device 310, and a control node for controlling the operation of the at least one access node. The operation of the service network 320 is in compliance with a first communication protocol, while the operation of the service network 330 is in compliance with a second communication protocol. In one embodiment, the service network 320 may be a Long Term Evolution (LTE) system and the service network 330 may be a Universal Mobile Telecommunications System (UMTS) system. The communications between the mobile communications device 310 and the service network 320 are in compliance with the release 8, release 9 or release 10 of the 3GPP specifications, while the communications between the mobile communications device 310 and the service network 330 are in compliance with the release 99, release 4, release 5, release 6, release 7, release 8, release 9 or release 10 of the 3GPP specifications. The mobile communication device 310 comprises a wireless module 311 for performing the functionality of wireless transmissions and receptions to and from the service networks 320 and 330. To further clarify, the wireless module 311 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in UMTS systems, or may be 900 MHz, 2100 MHz, or 2.6 GHz utilized in LTE systems, or others depending on the RAT in use. Also, the mobile communication device 310 comprises a controller module 312 for controlling the operation of the wireless module 311 and other functional components, such as a display unit and/or keypad serving as the MMI (man-machine interface), a storage unit storing the program codes of applications or communication protocols, or others. In addition to the UMTS system and the LTE system, it is to be understood that the invention may be applied to any future UMTS-based technology.

Figure 4:
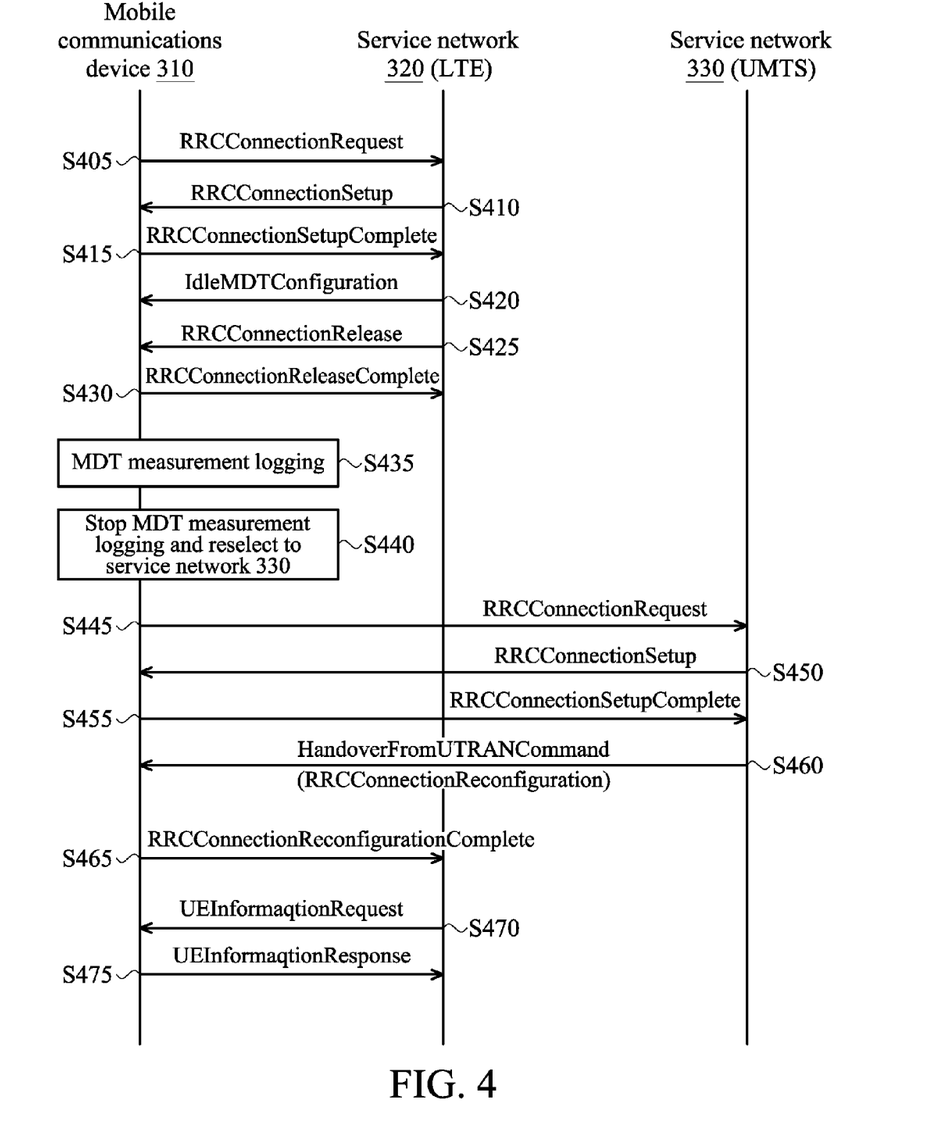
FIG. 4 is a message sequence chart illustrating an inter-RAT handover to an LTE system according to an embodiment of the invention.

To be more specific, the controller module 312 controls the wireless module 311 for report available Minimization of Drive Tests (MDT) logs during inter-RAT handover procedures. FIG. 4 is a message sequence chart illustrating an inter-RAT handover to an LTE system according to an embodiment of the invention. In this embodiment, the service network 320 is an LTE system, and the service network 330 is a UMTS system. Though the service network 330 is a UMTS system in this embodiment, the service network 330 may be a Global System for Mobile Communications (GSM), a Code division multiple Access 2000 (CDMA 2000) system, or a wireless communications system using any RAT other than the LTE technology. After being powered on, the mobile communications device 310 tries to establish a connection with the service network 320 to register itself to the service network 320. In order to do so, the controller module 312 transmits an RRCConnectionRequest message to the service network 320 via the wireless module 311 (step S405). Upon receiving the RRCConnectionRequest message, the service network 320 replies to the mobile communications device 310 with an RRCConnectionSetup message which includes configurations of the granted connection (step S410). With the configurations in the RRCConnectionSetup message, the controller module 312 configures the wireless module 311 and further transmits an RRCConnectionSetupComplete message to the service network 320 via the wireless module 311 (step S415). Next, the service network 320 transmits an IdleMDTConfiguration message to the mobile communications device 310 (step S420), requesting the mobile communications device 310 to perform MDT measurement logging in the idle mode. Later, when the registration is completed and no further communication is required, the service network 320 transmits an RRCConnectionRelease message to the mobile communications device 310 (step S425). In response to the RRCConnectionRelease message, the controller module 312 requests the wireless module 311 to release the connection. After the connection is released, the mobile communications device 310 transmits an RRCConnectionReleaseComplete message to the service network 320 via the wireless module 311 (step S430) and enters the idle mode. When being in the idle mode, the controller module 312 performs MDT measurement logging on the service network 320 via the wireless module 311 according to the previously received IdleMDTConfiguration message (step S435). Additionally, the controller module 312 may perform MDT measurement logging on one or more service networks other than the service network 320 via the wireless module 311, according to the IdleMDTConfiguration message. The IdleMDTConfiguration message may contain configuration parameters for the MDT measurement logging in the idle mode, such as measurement targets, quantity configurations, and others. For example, the measurement targets may include the frequency information and the information concerning the radio access technology of the cells to be measured, and the quantity configurations may indicate the unit of the measurements, such as the Reference Signal Received Power (RSRP) and the Reference Signal Received Quality (RSRQ) for an LTE system, the Received Signal Code Power (RSCP) and the signal-to-noise ratio Ec/No for a UMTS system, or the Received Signal Level (Rxlev) for a GSM system, etc. During the MDT measurement logging, the MDT logs are generated according to the measurements results, wherein the MDT logs may comprise time stamps of the performed measurements and indications of measured cells and measured signal qualities. Optionally, the MDT logs may further comprise location information of the mobile communications device 310 associated with the measurements.

Subsequently, when the mobile communications device 310 is moved to an area in which the signal quality of the service network 320 is below an acceptable threshold and the signal quality of the service network 330 is greater than the acceptable threshold, the mobile communications device 310 stops the MDT measurement logging and reselects to the service network 330 (step S440). Later, in response to a request for an MO call or an MT call, the controller module 312 transmits an RRCConnectionRequest message to the service network 330 via the wireless module 311 (step S445). Upon receiving the RRCConnectionRequest message, the service network 330 replies to the mobile communications device 310 with an RRCConnectionSetup message (step S450). Then, the controller module 312 configures the wireless module 311 according to the RRCConnectionSetup message, and further transmits an RRCConnectionSetupComplete message to the service network 330 via the wireless module 311 (step S455). The connection between the mobile communications device 310 and the service network 330 is established for the MO call or MT call. During the MO call or MT call, the mobile communications device 310 is moved back to the area in which the signal quality of the service network 330 is below the acceptable threshold and the signal quality of the service network 320 is greater than the acceptable threshold. In response to the movement, the service network 330 initiates an inter-RAT handover procedure by requesting the service network 320 to prepare an RRCConnectionReconfiguration message which includes configurations for the handover, and further transmits the RRCConnectionReconfiguration message to the mobile communications device 310. Specifically, the service network 330 places the RRCConnectionReconfiguration message in a HandoverFromUTRANCommand message to the mobile communications device 310 (step S460). The mobile communications device 310 retrieves the RRCConnectionReconfiguration message from the HandoverFromUTRANCommand message, and configures the wireless module 311 for the handover to the service network 320 from the service network 330 according to the configurations in the RRCConnectionReconfiguration message. After the configuration is completed, the controller module 312 prepares an RRCConnectionReconfigurationComplete message with indication of the availability of the MDT logs, and transmits the RRCConnectionReconfigurationComplete message to the service network 320 via the wireless module 311 (step S465). Note that, unlike the conventional design, the mobile communications device 310 indicates the availability of the MDT logs to the service network 320 by the RRCConnectionReconfigurationComplete message. Therefore, the service network 320 knows that the mobile communications device 310 has unreported MDT logs and transmits a UEInformaqtionRequest message to the mobile communications device 310 (step S470). When receiving the UEInformaqtionRequest message, the mobile communications device 310 replies to the service network 320 with a UEInformaqtionResponse message with the MDT logs (step S475).

Figure 5:
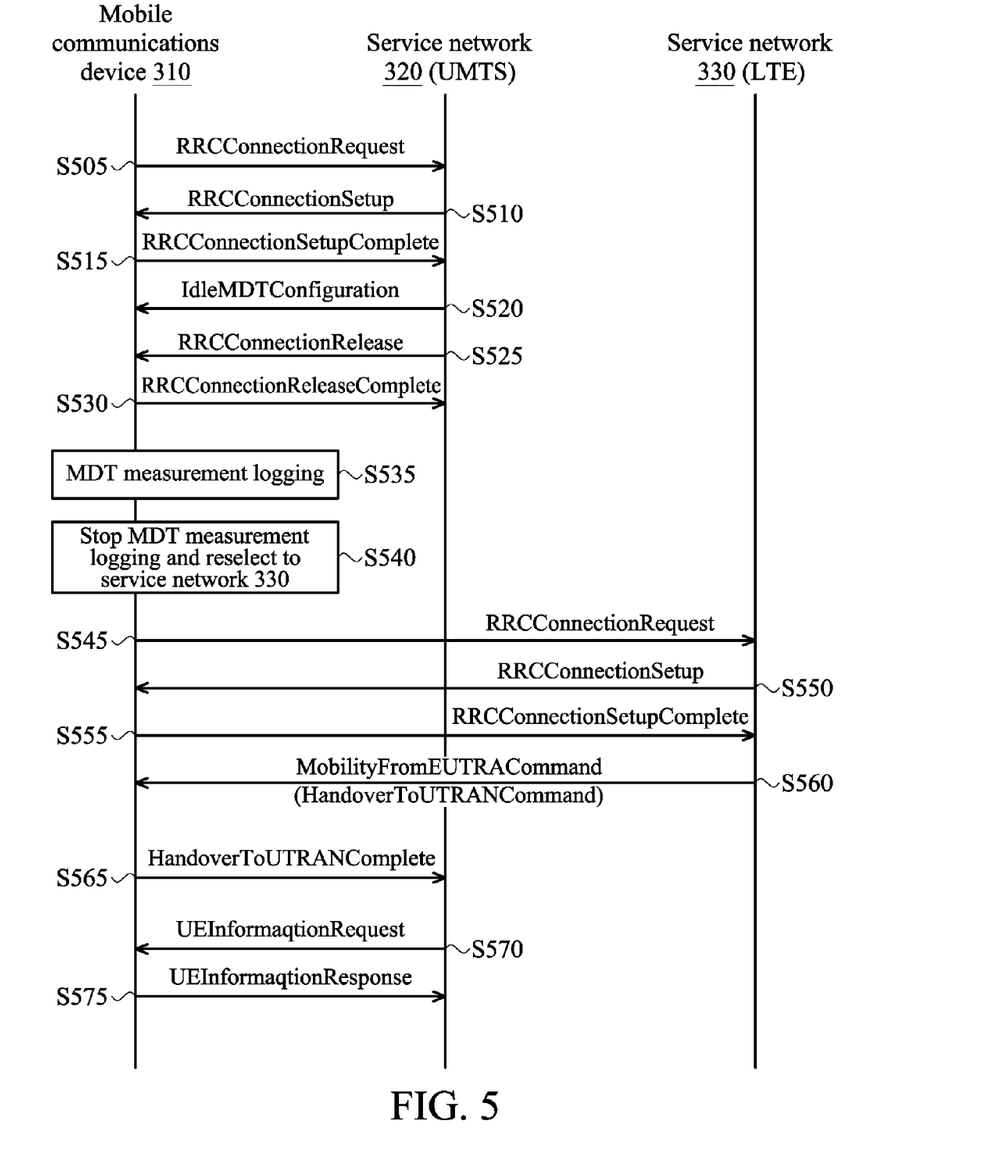
FIG. 5 is a message sequence chart illustrating an inter-RAT handover to a UMTS system according to an embodiment of the invention.

FIG. 5 is a message sequence chart illustrating an inter-RAT handover to a UMTS system according to an embodiment of the invention. In this embodiment, the service network 320 is a UMTS system, and the service network 330 is an LTE system. Though the service network 330 is an LTE system in this embodiment, the service network 330 may be a GSM system or any RAT other than the UMTS system. After being powered on, the mobile communications device 310 tries to establish a connection with the service network 320 to register itself to the service network 320. Similar to FIG. 4, the controller module 312 transmits an RRCConnectionRequest message to the service network 320 via the wireless module 311 (step S505), whereafter the service network 320 replies to the mobile communications device 310 with an RRCConnectionSetup message (step S510). Then, the controller module 312 transmits an RRCConnectionSetupComplete message to the service network 320 via the wireless module 311 after configuring the wireless module 311 according to the RRCConnectionSetup message (step S515). Different from FIG. 4, the RRCConnectionRequest message, the RRCConnectionSetup message, and RRCConnectionSetupComplete message in steps S505~S515 are prepared with the parameters specified in the standard for the UMTS system, such as the release 99, release 4, release 5, release 6, release 7, release 8, release 9 or release 10 of the 3GPP specifications. Next, the service network 320 transmits an IdleMDTConfiguration message to the mobile communications device 310 (step S520), requesting the mobile communications device 310 to perform MDT measurement logging in the idle mode. When the registration is completed and no further communication is required, the service network 320 transmits an RRCConnectionRelease message to the mobile communications device 310 (step S525). In response to the RRCConnectionRelease message, the controller module 312 releases the connection and further transmits an RRCConnectionReleaseComplete message to the service network 320 via the wireless module 311 (step S530). Different from FIG. 4, the IdleMDTConfiguration message, the RRCConnectionRelease message, and the RRCConnectionReleaseComplete message in steps S520~S530 are prepared with the parameters specified in the standard for the UMTS system.

After the connection is released, the mobile communications device 310 enters the idle mode and, thus, the controller module 312 performs MDT measurement logging on the service network 320 via the wireless module 311 according to the previously received IdleMDTConfiguration message (step S535). Additionally, the controller module 312 may perform MDT measurement logging on one or more service networks other than the service network 320 via the wireless module 311, according to the IdleMDTConfiguration message. The IdleMDTConfiguration message may contain configuration parameters for the MDT measurement logging in the idle mode, such as measurement targets, quantity configurations, and others. The measurement targets may include the frequency information of the cells to be measured, and the quantity configurations may indicate the unit of the measurements, such as the RSRP and RSRQ for an LTE system, the RSCP and Ec/No for a UMTS system, or the Rxlev for a GSM system, etc. During the MDT measurement logging, the MDT logs are generated according to the measurements results, wherein the MDT logs may comprise time stamps of the performed measurements and indications of measured cells and measured signal qualities. Optionally, the MDT logs may further comprise location information of the mobile communications device 310 associated with the measurements.

Subsequently, when the mobile communications device 310 is moved to an area in which the signal quality of the service network 320 is below an acceptable threshold and the signal quality of the service network 330 is greater than the acceptable threshold, the mobile communications device 310 stops the MDT measurement logging and reselects to the service network 330 (step S540). Later, in response to a request for an MO call or an MT call, the controller module 312 transmits an RRCConnectionRequest message to the service network 330 via the wireless module 311 (step S545). Upon receiving the RRCConnectionRequest message, the service network 330 replies to the mobile communications device 310 with an RRCConnectionSetup message (step S550). Then, the controller module 312 configures the wireless module 311 according to the RRCConnectionSetup message, and further transmits an RRCConnectionSetupComplete message to the service network 330 via the wireless module 311 (step S555). Note that the RRCConnectionRequest message, the RRCConnectionSetup message, and RRCConnectionSetupComplete message in steps S545~S555 are prepared with the parameters specified in the standard for the LTE system, such as the release 8, release 9 or release 10 of the 3GPP specifications. The connection between the mobile communications device 310 and the service network 330 is established for the MO call or MT call. During the MO call or MT call, the mobile communications device 310 is moved back to the area in which the signal quality of the service network 330 is below the acceptable threshold and the signal quality of the service network 320 is greater than the acceptable threshold. In response to the movement, the service network 330 initiates an inter-RAT handover procedure by requesting the service network 320 to prepare a HandoverToUTRANCommand message which includes configurations for the handover, and further transmits the HandoverToUTRANCommand message to the mobile communications device 310. Specifically, the service network 330 places the HandoverToUTRANCommand message in a MobilityFromEUTRACommand message to the mobile communications device 310 (step S560). The mobile communications device 310 retrieves the HandoverToUTRANCommand message from the MobilityFromEUTRACommand message, and configures the wireless module 311 for the handover to the service network 320 from the service network 330 according to the configurations in the HandoverToUTRANCommand message. After the configuration is completed, the controller module 312 prepares a HandoverToUTRANComplete message with indication of the availability of the MDT logs, and transmits the HandoverToUTRANComplete message to the service network 320 via the wireless module 311 (step S565). Note that, unlike the conventional design, the mobile communications device 310 indicates the availability of the MDT logs to the service network 320 by the HandoverToUTRANComplete message. Therefore, the service network 320 knows that the mobile communications device 310 has unreported MDT logs and transmits a UEInformaqtionRequest message to the mobile communications device 310 (step S570). When receiving the UEInformaqtionRequest message, the mobile communications device 310 replies to the service network 320 with a UEInformaqtionResponse message with the MDT logs (step S575).

Figure 6:
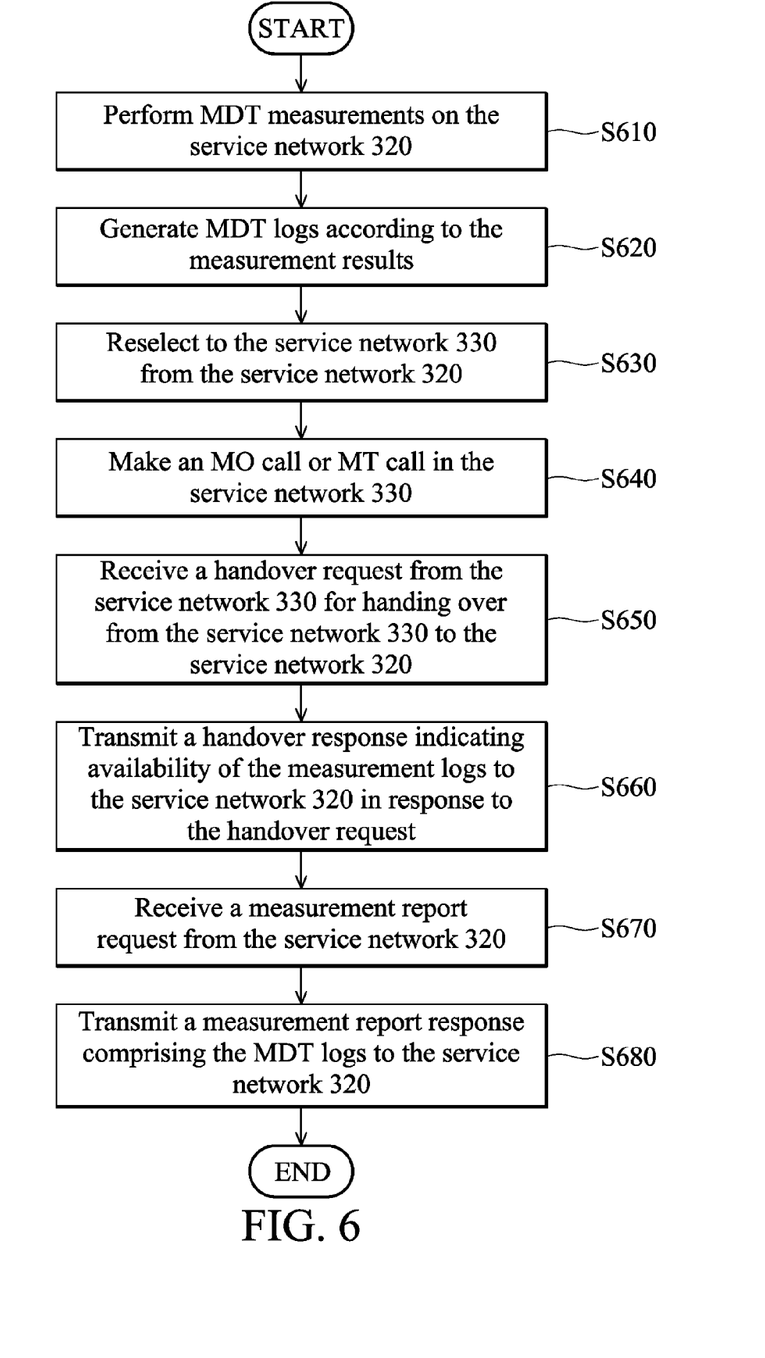
FIG. 6 is a flow chart illustrating the method for reporting availability of the MDT logs according to an embodiment of the invention.

FIG. 6 is a flow chart illustrating the method for reporting availability of the MDT logs according to an embodiment of the invention. The method for reporting availability of the MDT logs may be applied in any mobile communications device supporting the UMTS technology or the LTE technology, or both. Taking the mobile communications device 310 as an example, initially, the mobile communications device 310 is camped on the service network 320 which is in compliance with a first communication protocol. To begin, the mobile communications device 310 performs MDT measurements on the service network 320 (step S610), wherein the MDT measurements are requested by the service network 320 when the mobile communications device 310 is in the connected mode and is performed when the mobile communications device 310 enters the idle mode from the connected mode. The service network 320 may indicate to the mobile communications device 310 the configuration parameters for the MDT measurements, such as measurement targets, quantity configurations, and others. Next, the mobile communications device 310 generates MDT logs according to the measurement results (step S620). The MDT logs may comprise time stamps of the performed MDT measurements and indications of measured cells and measured signal qualities. Optionally, the MDT logs may further comprise location information of the mobile communications device 310 associated with the measurements. Later, the mobile communications device 310 reselects to the service network 330 from the service network 320 (step S630). Specifically, the service network 330 is in compliance with a second communication protocol, and the reselection to the service network 330 may be triggered in response to the mobile communications device 310 being moved to an area in which the signal quality of the service network 320 is below an acceptable threshold and the signal quality of the service network 330 is greater than the acceptable threshold. When camping on the service network 330, the mobile communications device 310 makes an MO call or MT call in the service network 330 in response to a request for the MO call or MT call (step S640). During the MO call or MT call, the mobile communications device 310 receives a handover request from the service network 330 for handing over from the service network 330 to the service network 320 (step S650). The handover request may be issued in response to the mobile communications device 310 being moved to an area in which the signal quality of the service network 330 is below an acceptable threshold and the signal quality of the service network 320 is greater than the acceptable threshold. After receiving the handover request, the mobile communications device 310 transmits a handover response indicating availability of the MDT logs to the service network 320 (step S660). Since the service network 320 knows from the handover response that the mobile communications device 310 has unreported MDT logs, it may requests the mobile communications device 310 for the MDT logs. That is, the mobile communications device 310 subsequently receives a measurement report request from the service network 320 (step S670). In response to the measurement report request, the mobile communications device 310 transmits a measurement report response comprising the MDT logs to the service network 320 (step S680), to end the steps of the method.

Note that the service network 320 may be a UMTS system or an LTE system, and the service network 330 may be a wireless communications system using an RAT other than the RAT used by the service network 320. For example, in one embodiment, the service network 320 is a UMTS system and the service network 330 may be one of an LTE system, a GSM system, or a CDMA 2000 system; while in another embodiment, the service network 320 is an LTE system and the service network 330 may be one of a UMTS system, a GSM system, or a CDMA 2000 system. It is to be understood that, though the service network 320 may be a UMTS system or an LTE system as described above, the invention is not limited thereto. Specifically, the service network 320 may be a wireless communications system using any evolutionary technology of the UMTS-based family. In addition to the LTE system, the GSM system, and the CDMA 2000 system, the service network 330 may be further selected from a Worldwide Interoperability for Microwave Access (WiMAX) system, a Wireless Broadband (WiBro) system, or others.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A mobile communications device, comprising:
a wireless module configured to perform wireless transmissions and receptions to and from a first service network or a second service network, wherein the first service network and the second service network are in compliance with a first Radio Access Technology (RAT) and a second RAT, respectively; and
a controller module configured to
perform Minimization of Drive Tests (MDT) measurements logging on the first service network via the wireless module, when the mobile communications device is in an idle mode with the first service network, wherein the MDT measurement logging is performed according to configuration parameters configured by the first service network;
generate an MDT measurement log according to measurements results;
reselect to the second service network from the first service network after the MDT measurement log is generated;
after a connection between the mobile communications device and the second service network is established, receive an inter-RAT handover request from the first service network, which is forwarded by the second service network, via the wireless module for handing over from the second service network to the first service network; and
in response to the inter-RAT handover request, transmit an inter-RAT handover response including an indication of availability of the MDT measurement log, which is previously generated but unreported to the first service network when the mobile communications device was previously in the idle mode with the first service network, to the first service network via the wireless module,
wherein the inter-RAT handover request is an RRC CONNECTION RECONFIGURATION message retrieved from a HANDOVER FROM UTRAN COMMAND message and the inter-RAT handover response is an RRC CONNECTION RECONFIGURATION COMPLETE message, under the first service network being a Long Term Evolution (LTE) system and the second service network being a Universal Mobile Telecommunications System (UMTS), or, the inter-RAT handover request is a HANDOVER TO UTRAN COMMAND message retrieved from a MOBILITY FROM EUTRA COMMAND message and the inter-RAT handover response is a HANDOVER TO UTRAN COMPLETE message, under the first service network being a Universal Mobile Telecommunications System (UMTS) and the second service network being a Long Term Evolution (LTE) system.

2. The mobile communications device of claim 1, wherein the controller module further receives a measurement report request from the first service network via the wireless module after the transmission of the inter-RAT handover response, and transmits a measurement report response comprising the MDT measurement log to the first service network via the wireless module.

3. The mobile communications device of claim 1, wherein the MDT measurement log comprises time stamps of the measurements and indications of measured cells and measured signal qualities.

4. The mobile communications device of claim 1, wherein the controller module further performs measurements on a third service network via the wireless module, and the third service network comprises one of the following:
a Universal Mobile Telecommunications System (UMTS);
a Long Term Evolution (LTE) system;
a Global System for Mobile Communications (GSM); and
a Code Division Multiple Access 2000 (CDMA 2000) system.

5. A method for reporting availability of a measurement log in a mobile communications device, comprising:
performing Minimization of Drive Tests MDT measurement logging on a first service in network in compliance with a first Radio Access Technology (RAT), when the mobile communications device is in an idle mode with the first service network, wherein the MDT measurement logging is performed according to configuration parameters configured by the first service network;
generating an MDT measurement log according to measurements results;
reselecting to a second service network, which is in compliance with a second RAT, from the first service network after the MDT measurement log is generated;
after a connection between the mobile communications device and the second service network is established, receiving an inter-RAT handover request from the first service network via the second service network, for handing over from the second service network to the first service network; and
transmitting an inter-RAT handover response including an indication of availability of the MDT measurement log, which is previously generated but unreported to the first service network when the mobile communications device was previously in the idle mode with the first service network, to the first service network in response to the inter-RAT handover request, wherein the inter-RAT handover request is an RRC CONNECTION RECONFIGURATION message retrieved from a HANDOVER FROM UTRAN COMMAND message and the inter-RAT handover response is an RRC CONNECTION RECONFIGURATION COMPLETE message, under the first service network being a Long Term Evolution (LTE) system and the second service network being a Universal Mobile Telecommunications System (UMTS), or, the inter-RAT handover request is a HANDOVER TO UTRAN COMMAND message retrieved from a MOBILITY FROM EUTRA COMMAND message and the inter-RAT handover response is a HANDOVER TO UTRAN COMPLETE message, under the first service network being a UMTS system and the second service network being an LTE system.

6. The method of claim 5, further comprising receiving a measurement report request from the first service network after the transmission of the inter-RAT handover response, and transmitting a measurement report response comprising the MDT measurement log to the first service network.

7. The method of claim 5, wherein the MDT measurement log for MDT comprises time stamps of the measurements and indications of measured cells and measured signal qualities.

8. The method of claim 5, further comprising performing measurements on a third service network, wherein the third service network comprises one of the following:
- a Universal Mobile Telecommunications System (UMTS);
- a Long Term Evolution (LTE) system;
- a Global System for Mobile Communications (GSM); and
- a Code Division Multiple Access 2000 (CDMA 2000) system.

9. A service network in compliance with a first Radio Access Technology (RAT), comprising:
- at least one access node configured to perform wireless transmissions and receptions to and from a mobile communications device; and
- a control node configured to transmit an inter-RAT handover request for handing over the mobile communications device to the service network from another service network in compliance with a second RAT, a receive an inter-RAT handover response including an indication of availability of a Minimization of Drive Tests (MDT) measurement log from the mobile communications device via the access node, and request, via the access node, the mobile communications device to report the MDT measurement log in response to the inter-RAT handover response, wherein the MDT measurement log is previously generated by the mobile communications device through MDT measurement logging performed on the service network but is unreported to the service network when the mobile communications device was in an idle mode with the service network before reselecting to the other service network, and wherein the inter-RAT handover request is an RRC CONNECTION RECONFIGURATION message included in a HANDOVER FROM UTRAN COMMAND message and the inter-RAT handover response is an RRC CONNECTION RECONFIGURATION COMPLETE message, under the first RAT being specified for a Long Term Evolution (LTE) system and the second RAT being specified for a Universal Mobile Telecommunications System (UMTS), or, the inter-RAT handover request is a HANDOVER TO UTRAN COMMAND message included in a MOBILITY FROM EUTRA COMMAND message and the inter-RAT handover response is a HANDOVER TO UTRAN COMPLETE message, under the first RAT being specified for a UMTS system and the second RAT being specified for an LTE system.

* * * * *